United States Patent [19]

Hay, Jr.

[11] 3,723,312
[45] Mar. 27, 1973

[54] COMBINED STAIN RETARDANT AND SEPARATOR INTERLEAVING MATERIAL FOR GLASS SHEETS

[75] Inventor: William J. Hay, Jr., Cheswick, Pa.
[73] Assignee: PPG Industries, Inc., Pittsburgh, Pa.
[22] Filed: Dec. 18, 1970
[21] Appl. No.: 99,500

[52] U.S. Cl. ................252/11, 65/24, 206/62, 252/381
[51] Int. Cl. ..............................F16k 31/00
[58] Field of Search ..........252/381, 384, 11; 206/62; 214/10.5 R; 65/24; 117/6, 27, 100 A

[56] References Cited

UNITED STATES PATENTS

| | | | |
|---|---|---|---|
| 2,476,145 | 7/1949 | Gwyn et al. | 206/62 R |
| 2,598,319 | 5/1952 | Throdahl | 117/100 |
| 2,796,353 | 6/1957 | Dieman | 252/142 X |
| 2,956,926 | 10/1960 | Greit | 252/384 |
| 2,992,747 | 7/1961 | Atkeson | 214/10.5 |

FOREIGN PATENTS OR APPLICATIONS 861,578  2/1961  Great Britain

Primary Examiner—John D. Welsh
Attorney—Chisholm & Spencer

[57] ABSTRACT

Sheets of glass are packaged, using in place of interleaving paper a dedusted agglomerated salicylic acid or a mixture of dedusted agglomerated salicylic acid and inert separator material, such as polystyrene beads. A novel method for agglomerating the acid is disclosed with the resulting salicylic acid agglomerated with polyethylene oxide and comprising substantially spherical particles less than about 30 mesh and having only a minor portion less than about 200 mesh. In accelerated staining tests agglomerated salicylic acid protects against staining slightly less than interleaving paper with its high application cost; agglomerated salicylic acid may be applied to sheets of glass with application costs on the order of those for applying wood flour or Lucite, which have extremely limited or negligible stain-retardant qualities, and this agglomerated material prevents surface scratching better than interleaving paper and nearly as well as an inert spherical separator.

4 Claims, No Drawings

COMBINED STAIN RETARDANT AND SEPARATOR INTERLEAVING MATERIAL FOR GLASS SHEETS

CROSS-REFERENCE TO RELATED APPLICATIONS

This application is related to U. S. application Ser. No. 99,651 also filed on Dec. 18, 1970 by William J. Hay, Jr., Frank J. Pazul and Charles W. Lewis for "Packing Material and a Method of Packaging Glass Sheets," which is a continuation-in-part of their application Ser. No. 756,318, filed Aug. 29, 1968, now abandoned, and assigned to the assignee of the present invention. All of that related application is here incorporated by reference.

BACKGROUND OF THE INVENTION

This invention relates to a method for packaging glass sheets wherein the glass is protected from staining and from mechanical surface damage by interleaving adjacent sheets of glass with a chemically active stain retardant which is also a particulate solid and which physically separates the glass and reduces friction between adjacent sheets of glass when moved with respect to one another. More particularly this invention relates to a method of agglomerating a stain-retardant agent. This invention relates also, in a different aspect, to a stack of glass sheets having their surfaces protected against staining and mechanical surface damage by layers of a finely divided interleaving material comprising a stain-retardant support, such as agglomerated salicylic acid, or a mixture of an inert support and a stain retardant, one of said layers being positioned between each adjacent pair of glass sheets.

It is known to package a stack of sheets of glass with the use of paper as interleaving material. Interleaving material affords protection against staining but the methods known for applying interleaving paper are costly.

It is also known to use wood flour, Lucite or other particulate or finely divided interleaving materials as mechanical separators to prevent surface scratching of adjacent glass sheets in storage. Methods using particulate interleaving materials are low cost methods but the materials used afford little or no protection against staining during storage.

In accelerated staining tests at 140° F and 100 percent relative humidity, wood flour or unmodified Lucite give a life of about one week before staining is observed; interleaving paper protects glass from staining for about ten weeks.

British Pat. No. 861,578, issued in 1961, teaches the use of an interleaving material, to protect sheet glass against staining, of a mixture of a "slightly acid agent" and "an inert material in solid form, more particularly in the form of a powder." A preferred example of the invention is a mixture of sodium bisulfate with cellulose. We have tried a mixture of sodium bisulfate and Lucite, with the sodium bisulfate being used in an amount within the broad range indicated in the British patent. The cellulose and the Lucite may both be considered inert. In our tests, an interleaving material of sodium bisulfate as the active agent did not appear to afford any advantage over wood flour as respects stain-inhibiting properties. Moreover, the "cellulose material" referred to in this British patent is indicated as possibly being "wrapping paper." This implies that the method of the British patent is not characterized by the cost savings that are obtained when there can be used as the interleaving material a particulate material such as Lucite beads or wood flour.

SUMMARY OF THE INVENTION

Sheets of glass are packaged, using in place of interleaving paper a finely divided particulate interleaving material comprising a dedusted agglomerated organic acid, with not more than about 4,000 square feet of glass surface being protected by one pound of such interleaving material. The interleaving material is selected to have sufficient physical strength to mechanically separate and protect adjacent sheets of glass. In addition to the agglomerated organic acid inert particulate separating material, such as wood flour, polystyrene or Lucite, may be present up to about a ratio of 4:1 with respect to the agglomerated organic acid. The particle size of agglomerated organic acid is less than about 20 mesh and preferably less than about 30 mesh; it is greater than about 400 mesh and preferably greater than about 200 mesh; and if inert separator material is present its particle size is preferably less than that of the acid so that initially the organic acid separates and is in contact with the glass but after prolonged storage and volatilization or reaction of the acid the inert material remains to separate the glass and protect against scratching.

Agglomeration of a stain-inhibiting agent, such as a solid organic acid particularly salicylic acid or benzoic acid, is accomplished by mixing the agent with a binder, such as polyethylene oxide; tumbling or rolling the mixture to form substantially rounded, spherical or ovoid agglomerated particles generally having no sharp edges; drying the agglomerated particles by air-drying or contacting with absorbent or dessicant material; and screening the particles to yield a mixture of agglomerated particles having a confined size distribution. The size of the agglomerated particles is limited by upper and lower constraints. The particles must be small enough to be easily applied to glass sheets and retained on sheets in a steeply inclined position without rolling off. The particles must be large enough, greater than 400 mesh, to prevent respiratory ingestion, and a substantial fraction of the particles must be large enough to support adjacent glass sheets one from another. The stain-inhibitor particles are preferably agglomerated to a relatively large particle size and to rounded shapes so that they can serve to separate and support adjacent glass sheets and provide a rolling action to prevent surface scratching if one sheet of glass is moved laterally with respect to another.

Typically 95 to 98 percent by weight of a useful agglomerated organic stain-inhibitor passes through a U. S.. Standard Number 30 mesh screen, which permits particles smaller than 590 microns to pass, and at least 50 to 60 percent by weight of the agglomerated organic stain-inhibitor particles are typically retained on a U. S. Number 120 mesh screen, which passes particles smaller than 125 microns.

The organic acid must be selected according to its stain-inhibiting properties as disclosed in the copending application herein incorporated by reference namely U. S. application Ser. No. 99,651 filed Dec. 18, 1970.

Use of salicylic acid agglomerated by mixing with polyethylene oxide is effective to eliminate staining at 140° F and 100 percent relative humidity for about 8 to 10 weeks or nearly as long as interleaving paper even when it is mixed with an inert polystyrene in a ratio of 1:1; the application costs for use of this stain retardant particulate interleaving material approximate those for use of wood flour or Lucite, which have no particular stain-inhibiting properties.

DESCRIPTION OF THE PREFERRED EMBODIMENTS

The invention generally comprises a practice for packaging sheets of flat glass using, instead of interleaving paper, a solid particulate organic acid or a particulate solid impregnated with organic acid to both separate adjacent stored glass sheets and protect them from both staining and mechanical damage, such as scratching and marring. In addition to a particulate stain inhibitor, an inert carrier or basis material may be included in the interleaving material, with the two being mixed in suitable proportions such as 1:2 to 4:1, inert material to active stain inhibitor. Such particulate stain-inhibiting interleaving mixtures are applied to glass sheets in quantities as limited as one pound per 4,000 square feet of glass surface, but preferably in quantities somewhat more liberal such as one pound per 1,000 to 3,000 square feet of glass.

The particulate interleaving material may be applied to the glass by mechanical dusters or other particulate application equipment which is known per se to those skilled in the art of dusting glass with wood flour, Lucite or other inert particulate interleaving materials.

In accordance with the invention, the inert or carrier material comprises any suitable inert and finely divided material, such as wood flour, polyethylene, polystyrene or methacrylate polyester (Lucite). It is to be admitted that these materials, unmodified, have hitherto been used as interleaving materials in the packaging of flat glass, but not in circumstances where it was intended that the glass be stored for a substantial period of time. Lucite has an advantage over wood flour in that it is somewhat physically stronger and serves to protect the glass somewhat better against marring. On the other hand, wood flour, which is of a slightly acidic nature, may afford a slight advantage over Lucite, which is completely neutral and inert, in respect to the extent of stain inhibition. Neither of the materials, unmodified, affords to the sheets of flat glass to be packaged any protection against staining remotely approaching that afforded by the relatively more costly practice of using interleaving paper.

Those skilled in the art will appreciate that as the inert material or carrier material thereof, in the interleaving material there may also be used beads or small particles of other materials such as polyethylene, polystyrene, polytetrafluoroethylene, etc. In general, it is desirable that the material be relatively finely divided, such as about 20 mesh, and free-flowing. Preferably, the carrier material is somewhat finer, being less than about 30 mesh and most preferably is less than about 60 mesh. The material should be such as to exhibit suitable handling characteristics, enabling it to be fed onto the glass by means of commercially available equipment for handling and feeding finely divided solids.

The stain-inhibiting agent, according to the preferred embodiments of the invention, is a dedusted and agglomerated salicylic acid. Dedusting is desirable to reduce or eliminate potential handling problems due to slight toxicity of salicylic acid, which could cause irritation to workers handling such protected glass in the absence of protective clothing or equipment. Agglomeration of the salicylic acid to grains or particles of controlled size and substantially spherical shape provides the acid as a stain-inhibiting agent having appropriate physical characteristics to separate glass sheets and provide a rolling action between adjacent sheets when they are laterally moved with respect to one another.

In the most preferred embodiment salicylic acid is agglomerated with polyethylene oxide and methanol to form substantially spherical grains or particles of which 90 to 98 percent pass a 30 mesh screen. This agglomerated acid is mixed with an equal amount by weight of inert carrier, such as polystyrene, which comprises substantially spherical particles of lesser diameter than the agglomerated acid, preferably less than about 60 mesh. This interleaving material, when placed between glass sheets in storage, protects the glass from staining and from physical surface damage. Under magnification, for example, 50 times, the polystyrene may be observed as almost perfect spheres which are substantially smaller particles than the agglomerated salicylic acid. The size of the polystyrene spheres in the preferred embodiment is about No. 60 U. S. mesh. The agglomerated salicylic acid grains will be observed to be substantially spherical with diameters 4 to 10 times that of the polystyrene particles. The agglomerated salicylic acid grains are typically about No. 20 U. S. mesh and are generally less than about No. 30 U. S. mesh.

It is thought desirable to have the agglomerated acid act as the physical separator initially for intimate glass-stain-inhibitor contact, and it is though that as the organic acid volatilizes and reacts to prevent staining, the separation between adjacent glass sheets decreases according to the decreasing size of the agglomerated acid particles until separation is maintained by the inert carrier. It is thought that this expected decrease of spacing between glass sheets during storage combined with the corresponding volatilization of the organic acid insures complete contact, over the full glass surface area, between the glass and the acid or its vapors. This is thought to effectively exclude entry of water vapor between the sheets of glass and to effectively protect the glass uniformly over its surface. Though the mechanism by which the observed beneficial effect occurs is not fully understood, it is thought that having a stain inhibitor and separator as a single material yields benefits beyond the mere additive effect of the separate functions of a single stain inhibitor and a single inert separator of equivalent particle size.

In a second preferred embodiment agglomerated salicylic acid is used alone without any inert carrier. Until glass has been stored for so long that the acid is dissipated, this interleaving material protects as fully against staining and mechanical surface damage as that of the most preferred embodiment, but upon dissipation of the stain-inhibiting salicylic acid no inert separator remains to protect against surface marring. Also, excess usage of salicylic acid may be avoided by the dilution afforded by addition of inert carrier, as in the most preferred embodiment.

As the stain-inhibiting agent, materials other than salicylic acid may be found useful. Dedusted benzoic acid has a stain-inhibiting effect substantially on the order of that of salicylic acid, but it is perhaps a little less advantageous because of greater problems of handling, toxicity of irritation. Dedusted toluic acids have been found in our accelerated-staining tests to exhibit substantial stain-inhibiting properties, but at a given level of application (square feet of glass per pound of stain-inhibiting material), they are substantially less effective than either salicylic acid or benzoic acid. A reasonable amount of stain-inhibiting activity has been observed in adipic acid, which is substantially non-toxic. But a linear acid having three carboxyl groups, such as citric acid, inhibits staining only about as well as wood flour.

Useful stain-inhibiting agents thus comprise cyclic organic acids and linear organic acids having no more than two carboxyl groups. Preferred acids have a substantial vapor pressure at room temperature. In our accelerated-staining tests, we have not yet found any suitable inorganic stain-inhibiting agents, i.e., ones that afford a level of protection against staining such as that obtained with dedusted salicylic acid or with paper.

The stain-inhibiting agents are preferably agglomerated using polyethylene oxide but other binders, such as polyethylene glycol and polyvinyl pyrrolidone-vinyl acetate copolymer (about 40 percent vinyl acetate) are suitable as well. Acids impregnated into porous, solid, inert separator materials perform less suitably than agglomerated acids.

The accelerated-staining test is conducted by applying to the top surfaces of all but one of a suitable number, such as about five, of sample pieces of mirror-quality plate glass (about 8 by 10 inches) a predetermined quantity of the interleaving material to be tested, namely (unless otherwise specified) 2,000 square feet of glass per pound of material; stacking the sample pieces and clamping them together; then exposing the clamped stack, with the sample pieces held so that they lie in generally vertical planes, in a chamber under conditions of 100 percent relative humidity and 140° F; and then withdrawing a clamped stack from the chamber after a period of time and washing the glass with water and inspecting it to determine whether staining has taken place. In a test of this kind, staining is usually observed within three days to one week if wood flour or untreated beads of Lucite are used as the interleaving material, whereas, when interleaving paper is used, staining is usually not observed until the clamped stack has been so exposed for about 10 to 12 weeks.

The accelerated-staining test described above is considered quite severe in that the exposure of the glass to moisture is promoted to levels far above those ordinarily encountered, and it takes place at a temperature well above those ordinarily encountered in storage, so that whatever chemical reactions, etc., are causing the staining, they would be expected to accelerated. Moreover, in our tests we have used plate glass, which, like window glass, is considered somewhat more prone to exhibit staining than flat glass produced by the float process. In practice, staining is encountered with all three kinds of flat glass. It is not often a problem with glass stored for less than three months under normal rather than hot, moist conditions. This is so even if the interleaving material is one having little or no stain-inhibiting effect, such as wood flour or unmodified Lucite.

The staining problem in its practical and commercial aspect is properly to be viewed from the standpoint of probability; there is a probability that a given piece of glass will be stained before it can be used, and this is influenced by a great number of relevant factors, such as the kind of glass, length of storage, the temperature and humidity conditions during storage, and the kind of interleaving material used. Sometimes float glass packed in interleaving paper and stored for four months under cool, dry conditions will stain, and sometimes plate glass packed in wood flour and stored for ten months or more under hot, humid conditions will not. These exceptional results serve to show the uncertainties of protecting against glass staining but do not alter the probability that certain conditions will aggravate staining. The usefulness of the instant invention is that it appears to yield results, so far as the effect of interleaving material is concerned, that approach those obtained with interleaving paper, without being so costly to practice as paper-interleaving.

To find a commercially satisfactory substitute for the known practices is not an easy matter. If the stain-inhibiting agent, though effective, is even mildly deliquescent, it may create handling problems in the feeder by which it is supplied to the glass. It must be capable of being made available in a form finely divided enough to mix with the wood flour or Lucite or other material, and at the same time not so powdery or dusty as to create handling, irritation or toxicity problems. We have not yet found a liquid stain-inhibiting agent that is effective and at the same time non-volatile enough that it can be expected to have long-lasting effects. Some of the organic acids that are as stain-inhibiting as dedusted salicylic acid, or perhaps more so, are powerful skin irritants or lachrymators and would thus raise considerable safety problems, both in the operations of a glass manufacturer and in the operations of a glass manufacturer's customers or warehousemen. Indeed, salicylic acid itself, if not dedusted, in only marginally suitable for this very reason. It must be possible for the interleaving material to be removed readily from the glass before it is used. It is conceivable that a stain-inhibiting agent may comply with all the other requirements but prove useless because of its high cost and/or its poor availability. The number of candidate stain-inhibiting agents to be considered is very large, and when the determination of an appropriate and effective level of usage is also to be taken into account, the amount of research that can be devoted to the problem is enormous, but the applicant has considerably advanced the art by learning how to use dedusted agglomerated salicylic acid either along or in combination with an inert separator material. The discovery of the applicant that an agglomerated organic acid of selected particle configuration and size can be used to support the separation of glass sheets and at the same time retard staining in a manner which appears superior to that obtainable with other particulate interleaving materials appears to portend benefits beyond the specific organic acids already tested. Organic acids may be selected for their volatility, particle size and configuration (possibly expressed as specific surface area in the alternative) and for their susceptibility to agglomeration and their shape-control characteristics, and such organic acids may be used alone or in combination with inert carrier materials, preferably of smaller particle size, as interleaving material for glass sheets to inhibit staining and protect against glass surface damage, such as scratching or marring.

The invention described above is illustrated by the following Examples.

EXAMPLE I

An interleaving material having constituents in the following quantities is prepared.

| | |
|---|---|
| 5 parts, Salicylic Acid | 5 pounds |
| 0.13 parts, Polyethylene Oxide | 60 grams |
| 0.17 parts, Methyl Alcohol | 80 ml |
| 5 parts, Polystyrene | 5 pounds |

Into an eight quart-liquid solids blender (e.g., P-K blender manufactured by Patterson-Kelly Company) are charged the salicylic acid, which is unsublimed technical grade acid, and the polyethylene oxide (e.g., WSR-N10, sold by Union Carbide). After a one minute premix, with the blender intensifier still on, the methanol (of technical purity) is added over about 30 seconds. About 15 seconds after the last methanol enters the mixer, the intensifier bar is turned off. The shell of the blender is allowed to continue rotating for about 10 to 15 minutes. The agglomerated material is removed from the blender and air-dried and screened. About 90 percent of the agglomerated salicylic acid passes a 30 screen. All screen sizes correspond to U. S. Series equivalent mesh screens.

Polystyrene (e.g., Dylene 8, No. 60 Fines, sold by Sinclair-Koppers) is mixed with the agglomerated salicylic acid and the constituents mixed in the blender or in a drum mixer or by hand tumbling.

This mixture of dedusted agglomerated salicylic acid and polystyrene is applied to the surface of glass sheets as interleaving material with about one pound of material used per thousand square feet of glass surface. The glass sheets are stacked and clamped together. Several sets of glass sheets are prepared.

The stacked glass with interleaving between each adjacent pair of sheets is placed in a test chamber. The glass in the chamber is subject to accelerated staining test conditions. Temperature within the chamber is maintained at about 140° F. Relative humidity within the chamber is maintained at about 100 percent by maintaining a puddle of water on the floor of the chamber.

The stacked glass is held in the chamber for periods of 1 week to 10 weeks. The glass is then removed. The clamps are removed and the glass sheets unstacked. Each sheet is washed clear of interleaving material using water. The glass sheets are then visually inspected for iridescent staining. Those glass samples held in the chamber less than eight weeks exhibit no visually apparent staining. Some staining of samples held ten weeks in the chamber is observed.

While methyl alcohol is used as a solvent in the agglomerating procedure, and is particularly useful in this function, any other convenient organic solvent may be used to insure that all the polyethylene oxide binder is intimately mixed with the salicylic acid to agglomerate it.

EXAMPLE II

The test of Example I is repeated except no polystyrene is used. Stain-test results are identical.

The effectiveness of the invention with respect to protection against abrasion may be deduced from the following tests.

TEST I

INTERLEAVING PAPER

Interleaving paper is placed between a number of pairs of 4-inch-square plates of polished glass. In turn each two-plate sample is placed in a Taber-Abraser test device, with the one glass plate fixed to the stationary base and the other glass plate fixed to the rotating head. A 500-gram load is imposed on the glass plates. One set of samples is subjected to abrasion for 300 revolutions; a second, for 600; and a third, for 900.

After the plates are rotated to induce abrasion damage, they are removed from the testing machine and examined in a light from a point source to detect scratching. All samples exhibit light scratching for the set evolved 300 times, and heavy scratching for the other sets.

TEST II

POLYSTYRENE

The procedure of Test I is repeated, except that the glass plates are separated by about 60 mesh polystyrene. No scratching is observed for the test revolved 300 times. About 25 percent of the plates in the set revolved 600 times are scratched. About 50 percent of the plates in the set revolved 900 times are scratched.

TEST III

SALICYLIC ACID

The procedure of Test I is repeated, except that the glass plates are separated by about 30 mesh agglomerated salicylic acid with no polystyrene. No scratching is observed for the set revolved 300 times. About 50 percent of the set revolved 600 times have scratches. All of the set revolved 900 times are scratched.

The above test show that agglomerated salicylic acid alone can protect glass sheets from mechanical surface damage.

The above examples and descriptions of the invention are not to be considered limiting, for, as will be apparent to one skilled in the art, many variations in material selection may be made without departing from the spirit of this invention.

I claim:

1. A method of preparing an agglomerate material for packaging glass sheets comprising the steps of:
    mixing an organic acid selected from the group consisting of cyclic acids and linear dicarboxylic acids with a binder selected from the group consisting of polyethylene oxide, polyethylene glycol, polyvinyl pyrrolidone-vinyl acetate copolymer and mixtures thereof;
    tumbling the mixture of organic acid and binder so as to roll the mixture into substantially rounded agglomerated particles of substantially uniform size such that at least about 50 percent by weight of the agglomerated organic acid is retained on a U.S. Number 120 mesh screen; and mixing the substantially rounded agglomerated organic acid particles with an inert separator material having a particle size such that substantially all of the inert separator passes a U. S. Number 60 mesh screen.

2. The method of preparing the agglomerate material of Claim 8 wherein the inert separator is mixed with the agglomerated organic acid in an amount ranging from (a) about one part inert separator to four parts agglomerated organic acid to (b) about two parts inert separator to one part agglomerated organic acid.

3. An agglomerate material suitable for packaging glass sheets to protect them from staining and scratching, comprising an organic acid selected from the group consisting of benzoic acid, salicylic acid, toluic acid, adipic acid and mixtures thereof agglomerated with a binder selected from the group consisting of polyethylene oxide, polyethylene glycol, polyvinyl pyrrolidone-vinyl acetate copolymer and mixtures thereof to form substantially rounded particles ranging from about U. S. Number 30 mesh to about U. S. Number 200 mesh, said organic acid being admixed in a ratio of from about one to four to about two to one with an inert separator material selected from the group consisting of wood flour, polyethylene, polystyrene, polymethylmethacrylate, polytetrafluoroethylene and mixtures thereof having substantial rounded particles ranging from about U. S. Number 60 mesh to about U. S. Number 200 mesh.

4. The method of preparing an agglomerate according to claim 1 wherein the inert separator is selected from the group consisting of wood flour, polyethylene, polystyrene, polymethylmethacrylate, polytetrafluoroethylene and mixtures thereof.

* * * * *

UNITED STATES PATENT OFFICE
CERTIFICATE OF CORRECTION

Patent No. 3,723,312      Dated March 27, 1973

Inventor(s) William J. Hay, Jr.

It is certified that error appears in the above-identified patent and that said Letters Patent are hereby corrected as shown below:

Claim 2, Column 9, line 10, "8" should be -- 1 --.

Signed and sealed this 18th day of September 1973.

(SEAL)
Attest:

EDWARD M. FLETCHER, JR.
Attesting Officer

RENE D. TEGTMEYER
Acting Commissioner of Patents